United States Patent Office 3,713,002
Patented Jan. 23, 1973

3,713,002
DYNAMOELECTRIC MACHINE WITH DIFFERENTIAL PROTECTION SYSTEM INCLUDING MEANS FOR AIR GAP MONITORING
Eugene C. Whitney, Pittsburgh, Pa., assignor to Westinghouse Electric Corporation, Pittsburgh, Pa.
Filed Jan. 17, 1972, Ser. No. 218,105
Int. Cl. H02h 7/06
U.S. Cl. 317—13 R                                                6 Claims

ABSTRACT OF THE DISCLOSURE

A dynamoelectric machine is provided with an improved system for protecting against abnormal conditions wherein the stator windings for each electrical phase include a plurality of parallel winding portions mutually connected to an external lead with current transformers on each parallel for sensing conditions therein and detecting unbalanced conditions therebetween such as may be caused by air gap non-uniformity. An additional current transformer is provided on the external lead for a given phase and interconnected, such as through appropriate relaying means, to the current transformers on the individual parallels for detecting overall machine unbalances. The invention is particularly beneficial in machines such as large generators where it is important to insure stable air gap distribution while minimizing the number and size of necessary conductors.

BACKGROUND OF THE INVENTION

Field of the invention

The invention relates to dynamoelectric machines and particularly to polyphase generators.

Description of the prior art

It has been the practice in the past to provide a plurality of parallel conductors in each phase winding in certain dynamoelectric machines such as large generators. Differential protection is normally provided by having a current transformer on the power side of the set of parallel winding portions for each phase and also one on the neutral side of the set of parallel winding portions for each phase so that currents in and out of the total phase winding can be sensed and compared with each other for indicating any unbalanced condition that may require correction. Turn-to-turn short circuits may be detected by additional current transformers on two individual conductors, or groups of conductors, of a given phase with their secondaries connected through a differential relay. Air gap monitoring has not previously been a purpose in differential protection. Reference may be made to Standard Handbook for Electrical Engineers, ninth edition, A. E. Knowlton, editor-in-chief, 1957, secs. 271–272, for additional description of the prior art.

In very large machines, it is particularly desirable to monitor air gap conditions because of the relatively large movements due to thermal effects and the large effects of magnetic pull that tends to amplify air gap variations. Certain generators have been designed to produce 600 megawatts of power in units with overall physical dimensions of about 60 feet. In copending application Ser. No. 189,884, filed Oct. 18, 1971, by the present inventor and assigned to the present assignee, there is disclosed an improved mechanical mounting scheme for the stator that is intended to insure air gap uniformity in such machines. It is desirable, however, to provide additionally an electrical protection system for indicating any air gap variations that may occur. It was in an effort to provide such protection for such machines that the present invention was developed.

Any electrical protection system in large generators should achieve its purposes without presenting additional problems in terms of cost or number and size of components and conductors. In large generators handling thousands of amperes, conductors of large cross-section may be necessary but the number and length of such conductors should be minimized.

SUMMARY OF THE INVENTION

In accordance with the present invention a current transformer is disposed on each of a plurality of parallel winding portions of each electrical phase, preferably on the side thereof remote from the eternal lead of the group of parallels. An additional current transformer is disposed on an external lead for a group of interconnected parallels. The secondary windings of all of these current transformers are mutually interconnected, such as through appropriate relaying means, for monitoring unbalanced current conditions between individual ones of the parallel winding portions, by comparison of current through an individual parallel with an average for the several windings. There is also provided means for detecting current unbalances overall through a group of interconnected phase windings.

Also in accordance with this invention the provision of an external power lead from the neutral side of the group of parallels of a phase winding is made unnecessary for the differential protection scheme and the only external power leads required are those from the power side of each phase. The importance of reducing the number of external leads from the stator winding has significance in large machines because of the inherent problems associated with carrying large currents, such as 45,000 amperes in some designed machines, as well as the cost of the required conductors. Thus, in the typical case of a three-phase generator only three main leads need be brought to termination outside the stator. Past machines have required external leads for, usually, 3, 6 or 9 neutral leads as well as the three main leads.

Among the types of unbalanced conditions which are monitored in the system in accordance with this invention are third harmonic variations and also current differences as a function of load.

THE DRAWINGS

PREFERRED EMBODIMENTS

Figure 1:
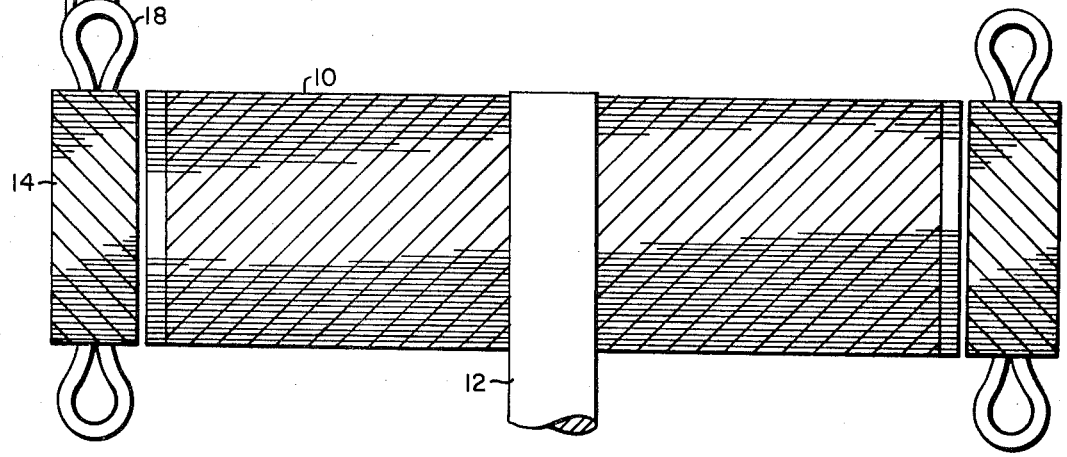
FIG. 1 is a general outline view of a dynamoelectric machine in which the present invention may be practiced.

Referring to FIG. 1, an example of a dynamoelectric machine in which the present invention may be advantageously practiced is generally illustrated. This machine is a generally known type of machine such as for use as a water wheel generator. A salient pole rotor 10 is mounted on a vertical shaft 12 for rotation within a stator 14 that surrounds the rotor with inductive coupling therebetween across an air gap 16. The stator 14 is provided with an armature winding 18 to generate power, typically of three electrical phases, as influenced by the rotation of the rotor 12. A number of external leads 21, 22 and 23 are provided from the stator winding 18 for transmission and distribution of the power.

Figure 2:
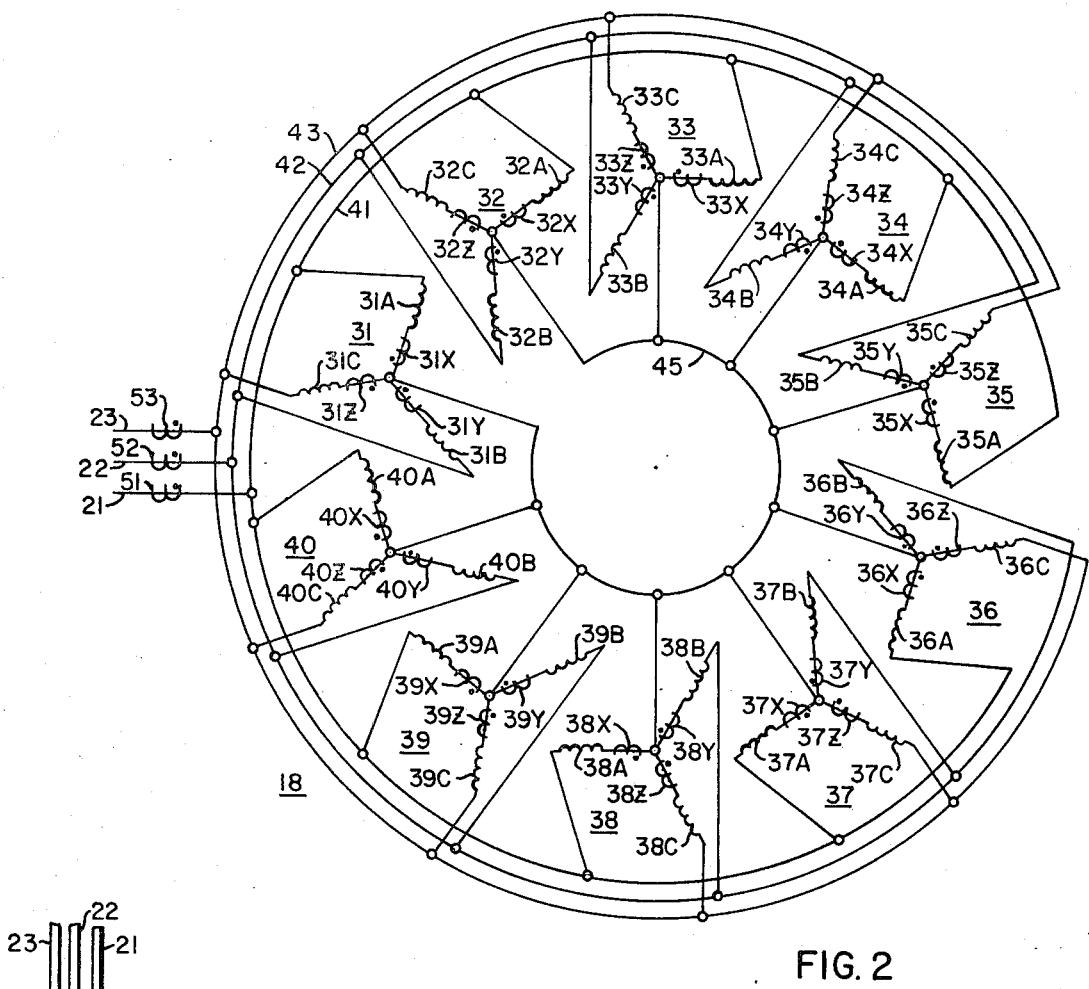
FIG. 2 is an electrical circuit schematic of a stator winding in a machine embodying the present invention showing location of current transformers of a protection scheme in accordance with this invention.

Referring to FIG. 2, a three-phase armature winding 18 is illustrated which comprises a plurality, here ten, of electrically parallel winding portions 31 through 40. Each parallel winding portion has three phase windings 31A, 31B, and 31C, etc., in a Y connection with a neutral connection point between the three phases of a particular parallel winding portion. The corresponding phase windings of each of the parallels 31 through 40 are interconnected by conductors 41, 42 and 43, commonly referred to as parallel rings, extending therearound and from each of which there extends one of the external leads 21, 22 and 23.

The neutral points of each of the parallel winding portions 31 through 40 are interconnected in FIG. 2 by a conductor referred to as a neutral ring 45, although it has been found unnecessary to provide such a neutral ring connection for the differential protection scheme and, even if provided, it is found preferable to avoid any external lead connection thereto. The illustrated embodiment is one for a machine in which it is intended to use the neutral ring for connection to a grounding transformer.

Also, as shown in FIG. 2, on the neutral side of each phase of the parallel polyphase windings 31 through 40 a current transformer is provided and identified by the reference numeral of the winding portion and a letter (e.g. 31X, 31Y, and 31Z, etc.). Additionally, current transformers 51, 52 and 53 are individually provided on each of the three external leads 21, 22 and 23, respectively.

In the illustrated embodiment, the current transformers on the individual parallels are on the neutral side thereof although they may be alternatively located on the hot side.

The current transformers illustrated in FIG. 2 are those pertaining to the protective system in accordance with this invention. However, it is to be understood that normally additional current transformers would be provided on the external leads and perhaps on the neutral side of the phase conductors for other purposes in accordance with known practice. In FIG. 2 only the locations and preferred polarities of the relevant current transformers are indicated and not the manner of their interconnection into the protective system.

Figure 3:
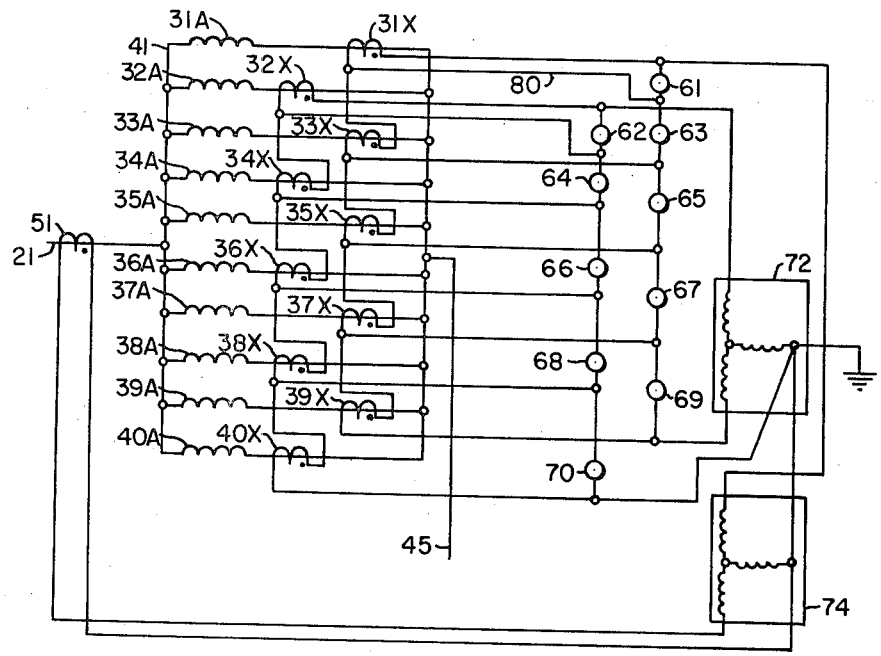
FIG. 3 is an electrical circuit schematic of a stator winding and protection scheme in accordance with this invention for one electrical phase.

Referring to FIG. 3, the stator windings are redrawn to show the protection system of an individual phase. The individual ones of the ten parallels 31A through 40A are numbered in FIG. 3 to correspond to their identification in the view of FIG. 2 as are the external lead 21 parallel ring 41 and the neutral connection 45. Additionally, FIG. 3 illustrates the current transformers as are illustrated in FIG. 2 and also their interconnection into a protective system in accordance with this invention.

In FIG. 3 the secondaries of the current transformers on the parallel branches are interconnected in a particular phase by connections from one side of a first current transformer (e.g. 31X) to the opposite side of a third current transformer (33X) and from the first side of that current transformer to the opposite poled side of a fifth current transformer 35X and so forth, as shown, so that the ten current transformers illustrated for the first phase have alternate groups of five (31X, 33X, 35X, 37X and 39X in one group and 32X, 34X, 36X, 38X, and 40X in the other) interconnected in a serial manner.

Additionally, relays 61 through 70 are respectively connected across each of the current transformers 31X through 40X. Each of the relays 61–70 and its associated current transformer 31X–40X is in a loop circuit. At least one side of the loop circuit in which each transformer is located is shared with an adjacent loop circuit so current comparison results. For example, conductor 80 carries current sensed by transformer 31X and also that sensed by transformer 33X, but it is the vector difference current between transformer 31X and 33X, thus reducing the burden on each transformer to a negligible figure and permits the use of small conductors.

The two groups of five current transformers are connected across an additional relaying means 72 herein referred to as a split phase relay. Furthermore, the various current transformers for particular phase are mutually interconnected on one side to a further relaying means 74, herein referred to as a differential relay, the other side of which is connected to the current transformer and the external lead. The other windings for the other two phases have their protective systems interconnected in like manner with additional current transformers and relaying means.

Figure 4:
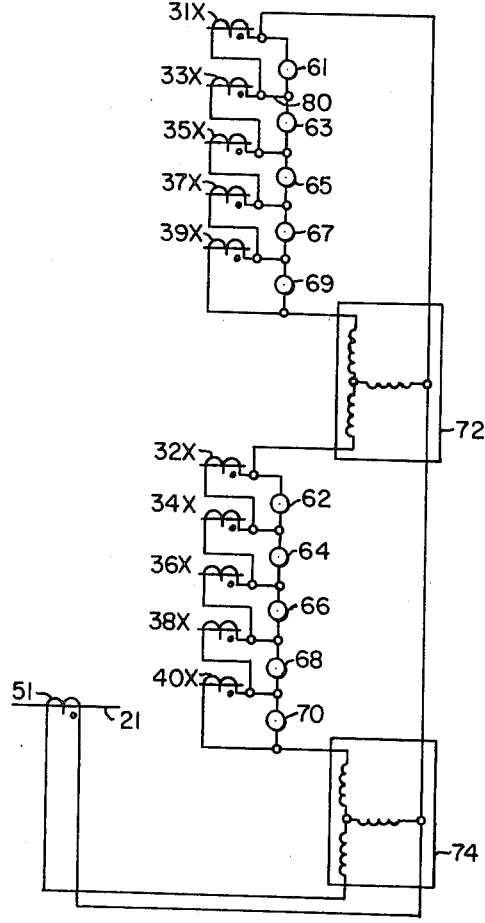
FIG. 4 is an electrical circuit diagram of the protection circuit of the system illustrated in FIG. 3.

In FIG. 4, there is shown the protective system for a single phase of the system of FIG. 3. This view illustrates in a different form the manner of interconnecting the alternate ones of the secondaries of current transformers in two groups of five with a split phase relay 72 disposed therebetween and individual relays 61 through 70 connected across each of the current transformers of the individual parallels. Additionally, there is shown the differential relay 74 which connects the system for the entire phase between the current transformer 51 on the main lead for that phase.

In operation the differential relay 74 provides a means for indication of unbalances between the input and output of the entire phase in a manner equivalent to that employed in prior systems. The split phase relay 72 may be used if desired to provide information with respect to unbalances between the two sets of parallels. The principal improvement in accordance with this invention is provided by the individual relaying means 61 through 70 connected across the individual current transformers for indication of current unbalance therebetween that would be otherwise undetected and may be caused by air gap variations.

A protection system is preferably provided for each phase as shown for the first phase in FIGS. 3 and 4.

Relaying means responsive to unbalanced current for turning on an alarm or otherwise indicating the presence of the abnormal condition are well known. Merely by way of further example, each of the relays 72 and 74 may be a Type SA-1 Static Generator or other differential relay and each of the relays 61 through 70 may be either type CO2 or CO8 (or both may be used as an extra precaution) or other current relay all of which types of relays are available from Westinghouse Electric Corporation. Conventional current transformers may also be used in this invention. Merely by way of example, the current transformers 31X–40X, 31Y–40Y, and 31Z–40Z may be Westinghouse type EMC current transformers and current transformers 51, 52 and 53 may be Westinghouse type BY. Other current comparison means may be used instead of the described relaying means.

Referring again to FIG. 2 in a given phase, under normal, balanced conditions, the currents sensed by each of the current transformers on the individual parallels will be equal and none of relays 61–70 will respond. If a variation in the air gap dimension occurs, e.g. the rotor is closer to windings 31 and 40 than it is to windings 35 and 36, increased overexcited reactive currents will be sensed in the current transformers 31X and 40X and decreased overexcited reactive currents sensed in current transformers 35X and 36X that will be indicated by the relays because of the common branches of the loop circuits in which the current transformers are located. Thus, the illustrated protection scheme provides comparison of the current in any one current transformer with the current in any other one current transformer, fo a given phase, whether or not they are associated with physically adjacent windings or oppositely located windings.

Relays 61–70 actually read approximately 80% of the vector difference current between a particular current transformer and the average current through the entire group of current transformers 31X through 40X. The 80% is due to the current division due to two parallel paths for the current where the relay across one transformer has X resistance while the other path is through four other relays in series plus the split phase relay in series.

From the foregoing, it can be seen that the purpose of air gap monitoring is best effected in a machine having a relatively large number of distributed parallel windings. In the illustrated embodiment with ten parallels, each one-tenth of the air gap surface is monitored. In general, while the number of parallels may be smaller, the practice of the invention in machines having at least six distributed parallels in each phase is most suitable.

I claim:

1. A dynamoelectric machine comprising: a stator, a rotor inductively related to said stator with an air gap therebetween; said stator comprising a core having a winding thereon including, for each electrical phase, a plurality of electrically parallel conductors uniformly distributed about said stator and mutually connected to a common lead; a plurality of current transformers each having one of said parallel conductors as a primary winding; an additional current transformer disposed on said common lead; said current transformers having mutually interconnected secondary windings; current unbalance responsive means connected between current transformer secondary windings that are on electrically adjacent parallel winding portions for responding to unbalanced current between individual ones of said parallel winding portions and additional current unbalance responsive means connected between said plurality of current transformers on said parallel winding portions and said current transformer on said common lead.

2. The subject matter of claim 1 wherein: said secondary winding circuit comprises interconnections including said current unbalance responsive means between alternate ones of said parallel winding portions as they occur physically about said stator; said plurality of parallel winding portions comprising an even integral number, alternate ones of said current transformers thereon are interconnected into two groups and a third current unbalance responsive means is connected between said two groups.

3. The subject matter of claim 2 wherein: said machine is a polyphase machine with a number of at least six parallel winding portions in each phase and alternate ones of said current transformers on individual winding portions are interconnected through a common branch to one side of an individual current unbalance responsive means.

4. The subject matter of claim 3 wherein: said winding has a neutral connection between said plurality of parallel winding portions, said neutral connection being free of any current transformer thereon.

5. A polyphase dynamoelectric generator comprising: a stator having a generally cylindrical core with polyphase windings thereon; a rotor within said stator with an air gap therebetween; said polyphase windings comprising a plurality of parallel polyphase winding portions distributed uniformly about said stator, parallel winding portions of an individual phase being interconnected with an external conductive lead from said stator for each phase and a neutral point at which said polyphase windings of each of said parallel winding portions are joined; protective means for protecting against abnormal conditions in said windings comprising a current transformer with a secondary winding on each of said plurality of parallel polyphase winding portions near the neutral point connection thereof and additional current transformers each with a secondary winding on one of said external conductive leads for each electrical phase; means interconnecting individual ones of said secondary windings of said current transformers of said parallel winding portions to compare and respond to differences in condition therebetween; means interconnecting said secondary windings of said current transformers on said parallel winding portions with said secondary winding of said current transformer on said external leads.

6. The subject matter of claim 5 wherein: said parallel winding portions are in a number of at least six in each individual phase.

References Cited

UNITED STATES PATENTS 2,240,677   5/1941   Sonnemann _____ 317—27 R

OTHER REFERENCES

Standard Handbook for Electrical Engineers, 9th ed.; A. E. Knowton, editor in chief; 1957; secs. 271–273.

WILLIAM M. SHOOP, Jr., Primary Examiner

H. FENDELMAN, Assistant Examiner

U.S. Cl. X.R.

317—27 R, 156; 322—27, 90